(12) United States Patent
Watanabe (10) Patent No.: US 9,762,535 B2
(45) Date of Patent: Sep. 12, 2017

(54) INFORMATION PROCESSING APPARATUS, SYSTEM, METHOD AND MEDIUM

(71) Applicant: MURAKUMO CORPORATION, Tokyo (JP)

(72) Inventor: Takahiro Watanabe, Tokyo (JP)

(73) Assignee: MURAKUMO CORPORATION, Meguro-ku (JP)

(*) Notice: Subject to any disclaimer, the term of this patent is extended or adjusted under 35 U.S.C. 154(b) by 499 days.

(21) Appl. No.: 14/315,905

(22) Filed: Jun. 26, 2014

(65) Prior Publication Data
US 2014/0310341 A1 Oct. 16, 2014

Related U.S. Application Data

(63) Continuation of application No. PCT/JP2011/080103, filed on Dec. 26, 2011.

(51) Int. Cl.
*G06F 15/16* (2006.01)
*H04L 29/12* (2006.01)
(Continued)

(52) U.S. Cl.
CPC .......... *H04L 61/2571* (2013.01); *H04L 63/08* (2013.01); *H04L 67/02* (2013.01);
(Continued)

(58) Field of Classification Search
USPC ........................................................ 709/217
See application file for complete search history.

(56) References Cited

U.S. PATENT DOCUMENTS 7,356,687 B2 * 4/2008 Medvinsky ........... H04L 63/062
713/151
8,256,664 B1 * 9/2012 Balfanz ................. G06F 21/43
235/375
(Continued)

FOREIGN PATENT DOCUMENTS

JP 2002-334057 A 11/2002
JP 2011-227816 A 11/2011
(Continued)

OTHER PUBLICATIONS

Notice of Reason for Rejection dated Nov. 27, 2012, issued in corresponding Japanese Patent Application No. 2012-535479, with English Translation (5 pages).
(Continued)

*Primary Examiner* — Alicia Baturay
(74) *Attorney, Agent, or Firm* — Westerman, Hattori, Daniels & Adrian, LLP (57) ABSTRACT

A first server comprises: an information request reception unit that receives a request transmitted by a user terminal; an instruction code generating unit that generates a predetermined tag of causing the user terminal to connect to a second server for which a common session ID is to be used, and to receive the common session ID from the second server; an information generating unit that generates a web page that includes the predetermined tag, as a web page that is transmitted to the user terminal in response to the request; and an information transmission unit that transmits, to the user terminal, the common session ID and the generated web page including the predetermined tag.

9 Claims, 6 Drawing Sheets

(51) Int. Cl.
*H04L 29/08* (2006.01)
*H04L 29/06* (2006.01)

(52) U.S. Cl.
CPC .......... *H04L 67/146* (2013.01); *H04L 63/061* (2013.01); *H04L 63/168* (2013.01)

(56) References Cited

U.S. PATENT DOCUMENTS

| | | | |
|---|---|---|---|
| 8,505,106 B1* | 8/2013 | Bhosle | H04L 9/3213 709/206 |
| 8,966,446 B1* | 2/2015 | Amacker | G06F 11/3688 709/225 |
| 9,015,820 B1* | 4/2015 | Bhosle | H04L 9/3213 380/229 |
| 9,203,817 B2* | 12/2015 | Tsujimoto | H04L 63/08 |
| 2001/0025306 A1* | 9/2001 | Ninokata | H04L 29/06 709/218 |
| 2005/0283826 A1* | 12/2005 | Tahan | G06F 21/606 726/2 |
| 2006/0155780 A1* | 7/2006 | Sakairi | G06F 17/30867 |
| 2008/0222157 A1 | 9/2008 | Watanabe et al. | |
| 2009/0210863 A1* | 8/2009 | Vasilik | G06F 8/70 717/130 |
| 2011/0261388 A1 | 10/2011 | Tsujimoto | |
| 2012/0030732 A1* | 2/2012 | Shaty | G06F 21/50 726/3 |
| 2012/0159177 A1* | 6/2012 | Bajaj | H04L 9/3213 713/176 |

FOREIGN PATENT DOCUMENTS

| | | |
|---|---|---|
| WO | 2006/095400 A1 | 9/2006 |
| WO | 2011/013617 A1 | 2/2011 |

OTHER PUBLICATIONS

Notice for Reason for Rejection dated Apr. 9, 2013, issued in corresponding Japanese Patent Application No. 2012-535479, with English Translation (5 pages).

Furui, S., "Special Feature-Cookie Security Problem for Information Theft Prevention" Security Magazine, No. 6, vol. 12, pp. 45-52, Kabushiki Kaisha Shoeisha, Oct. 2002, Japan, Cited in JP Office Action dated Nov. 27, 2012, with partial English Translation.

Kawai, Y., "Easier Affiliation of User Authentication between EC Sites" Nikkei Internet Technology, Japan, Nikkei Business Publications, Inc., Feb. 22, 2001, No. 44, pp. 18-20, Cited in JP Office Action dated Apr. 9, 2013, with Partial English Translation.

Sakurai, T., "A Method of Adding New Function to Existing Web Sites in plurality of Domains", PROVISION, Japan, IBM Japan, Ltd., Feb. 6, 2006, vol. 13, No. 1, pp. 93-99, Cited in JP Office Action dated Apr. 9, 2013, with Partial English Translation.

* cited by examiner

INFORMATION PROCESSING APPARATUS, SYSTEM, METHOD AND MEDIUM

CROSS-REFERENCE TO RELATED APPLICATION

This application is a continuation application of International Application PCT/JP2011/080103 filed on Dec. 26, 2011 and designated the U.S., the entire contents of which are incorporated herein by reference.

FIELD

The present disclosure relates to a technique for management of communication with a user terminal, using a communication identifier.

BACKGROUND

Proposed session continuity methods in the case where a process is assigned to a server that is different from a previous server include, for instance, methods in which a correspondence table of state codes and states is held in respective servers beforehand such that, upon response to a client, a state code denoting a current state is included in a cookie and the cookie is returned, and a server that has received the cookie as a request restores the state on the basis of the state code (Japanese. Patent Application Publication No. 2002-334057).

SUMMARY

One aspect of the present disclosure is an information processing apparatus that uses a communication identifier in communication with a user terminal, comprising: an information request reception unit to receive an information request transmitted from the user terminal; an instruction code generation unit to generate an instruction code of causing the user terminal to connect to another information processing apparatus for which a communication identifier shared with the communication identifier is to be used, and to receive the shared communication identifier from the other information processing apparatus; an information generation unit to generate information including the instruction code, as information that is transmitted to the user terminal in response to the information request; and an information transmission unit to transmit, to the user terminal, the shared communication identifier and the information including the instruction code as generated by the information generation unit.

Herein, the communication identifier is an identifier, for instance a session ID or the like, for providing a service to each user terminal or user, through identification of communication with the user terminal or user. The information processing apparatus according to the present disclosure generates an instruction code (for instance, an HTML tag) that enables the user terminal to receive a shared communication identifier from another information processing apparatus, in a case where, for instance, an information request such as web page request is received from the user terminal. The instruction code is included in information (for instance, a web page) that is transmitted in response to the information request, to enable thereby the user terminal is caused to receive the shared communication identifier from the other information processing apparatus.

The present disclosure can be grasped also as a method that is executed by a computer, or as a program that prompts execution by a computer. The present disclosure can be grasped as an aspect where such a program is recorded in a recording medium that can be read by a device, machine or the like such as a computer. A recording medium readable by a computer or the like denotes herein a recording medium in which information such as data, programs and the like is stored electrically, magnetically, optically, mechanically or chemically, such that the recording medium can be read by a computer or the like.

DESCRIPTION OF EMBODIMENTS

Exemplary embodiments are explained next with reference to accompanying drawings. The exemplary embodiments below illustrate examples of embodiments, and are not meant to limit the present disclosure to the specific features explained below. The specific features according to the exemplary embodiments can be adopted, as appropriate, upon implementation of the embodiments.

<System Configuration>

Figure 1:
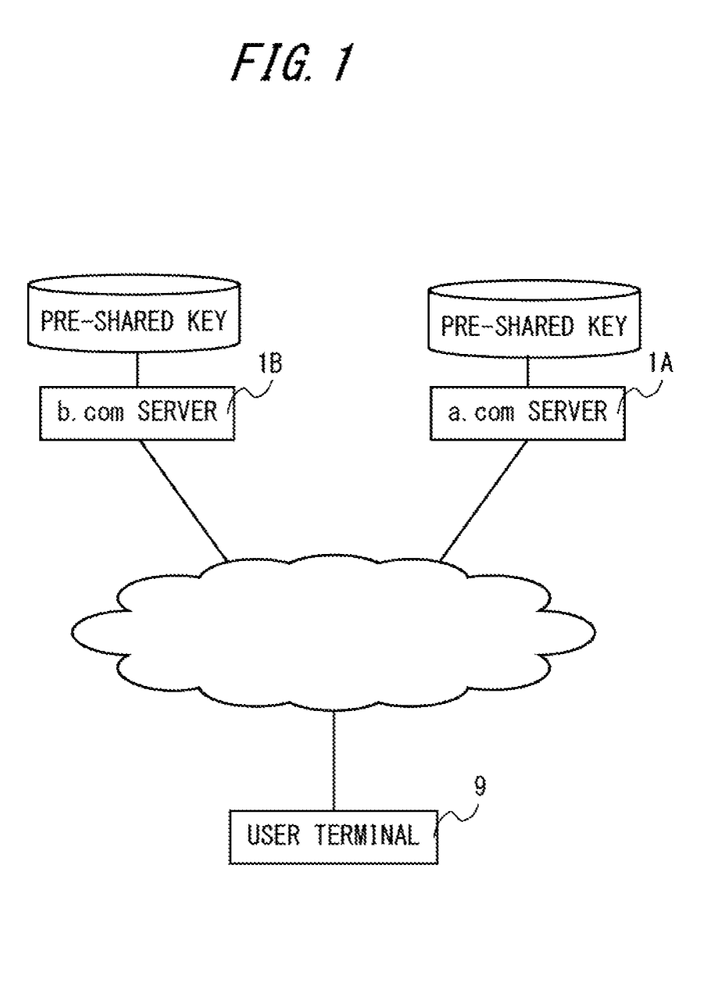
FIG. 1 is a diagram illustrating an outline of the configuration of a system according to an embodiment.

FIG. 1 is a diagram illustrating an outline of the configuration of a system according to the present embodiment. The system according to the present embodiment is provided with an a.com server 1A and a b.com server 1B that are connected so as to be capable of communicating with each other via a network such as the Internet. A user terminal 9 is connected, via the network, to the system according to the present embodiment. The a.com server 1A and the b.com server 1B may each be configured out of a single housing, or may be configured out of a plurality of housings that are connected via the network or the like.

The website "a.com" provided by the a.com server 1A and the website "b.com" provided by the b.com server 1B are websites that pertain to different domain names; herein, however, a cross-service across the sites is to be provided to the user. In a case where, to that end, a same user terminal 9 is connected to the a.com server 1A and the b.com server 1B, the a.com server 1A and the b.com server 1B preferably recognize connection by the same user terminal 9. The web browser provided in the user terminal 9, however, manages cookies for each domain name; herein, the cookies used for session management are given respectively dissimilar values from a.com and b.com, which cannot recognize connection by a same user.

By being provided with the below-described function, the system according to the present embodiment allows the a.com server 1A and the b.com server 1B to respectively recognize connection by a same user terminal 9, in a case where, under such an environment, a same user terminal 9 is connected to the a.com server 1A and the b.com server 1B.

The system according to the present embodiment allows thus providing a cross-service for a.com and b.com.

Figure 2:
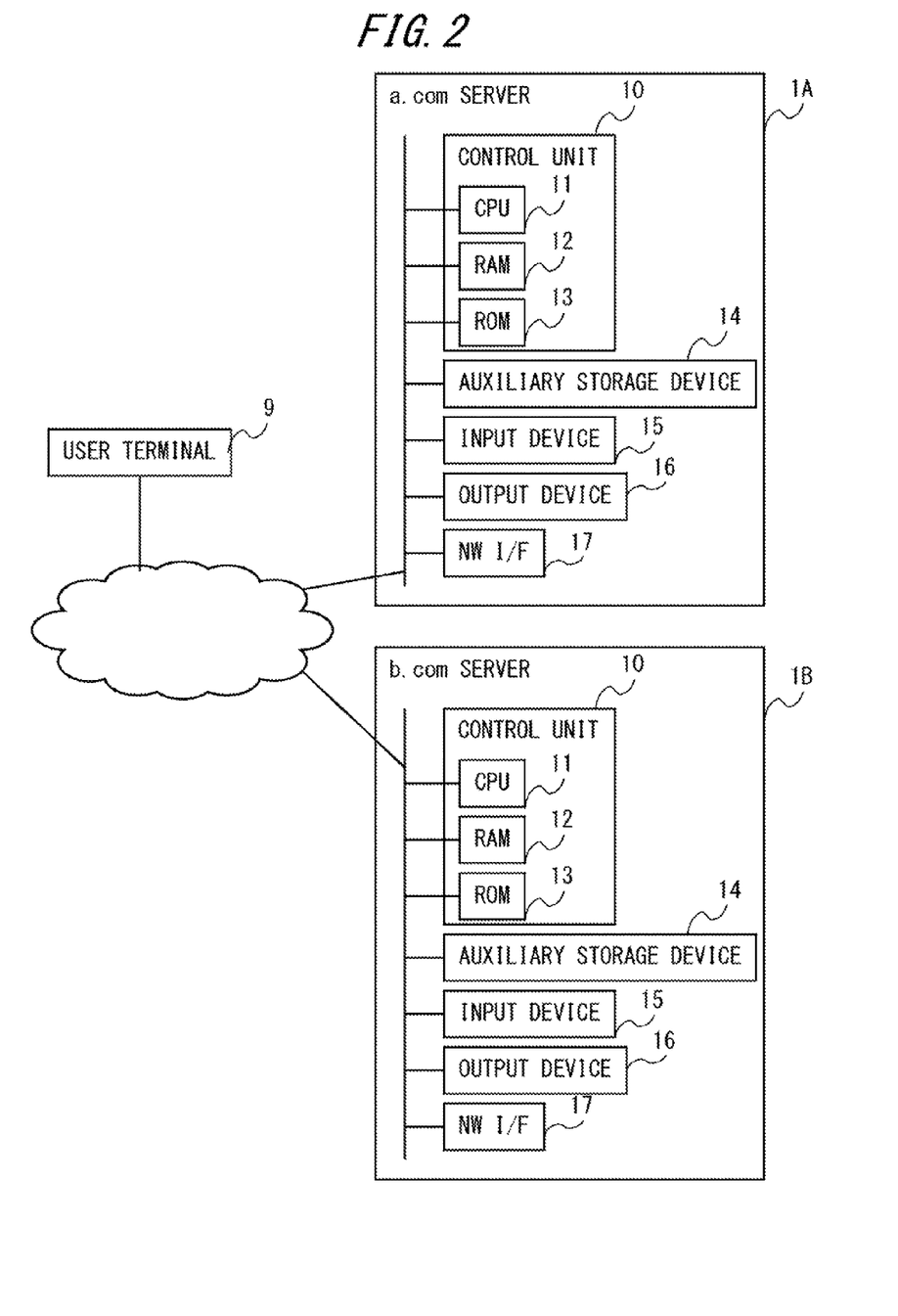
FIG. 2 is a diagram illustrating an outline of the hardware configuration of servers according to an embodiment.

FIG. 2 is a diagram illustrating an outline of the hardware configuration of the servers according to the present embodiment. The a.com server 1A and the b.com server 1B are each an information processing apparatus provided with a control unit 10 that comprises, for instance, a central processing unit (CPU) 11, a random access memory (RAM) 12, and a read only memory (ROM) 13, and with an auxiliary storage device 14, an input device 15, an output device 16, and a network interface 17.

In carrying out the present disclosure, however, the information processing apparatuses need not adopt a configuration identical to the one described above. The concrete hardware configuration of the information processing apparatuses may involve omissions, substitutions and additions of configuration elements according to the exemplary embodiments, as appropriate.

Like the servers, the user terminal 9 is an information processing apparatus (not shown) provided with a control unit comprising, for instance, a CPU, a RAM and a ROM, and with an auxiliary storage device, an input device, an output device and a network interface.

Figure 3:
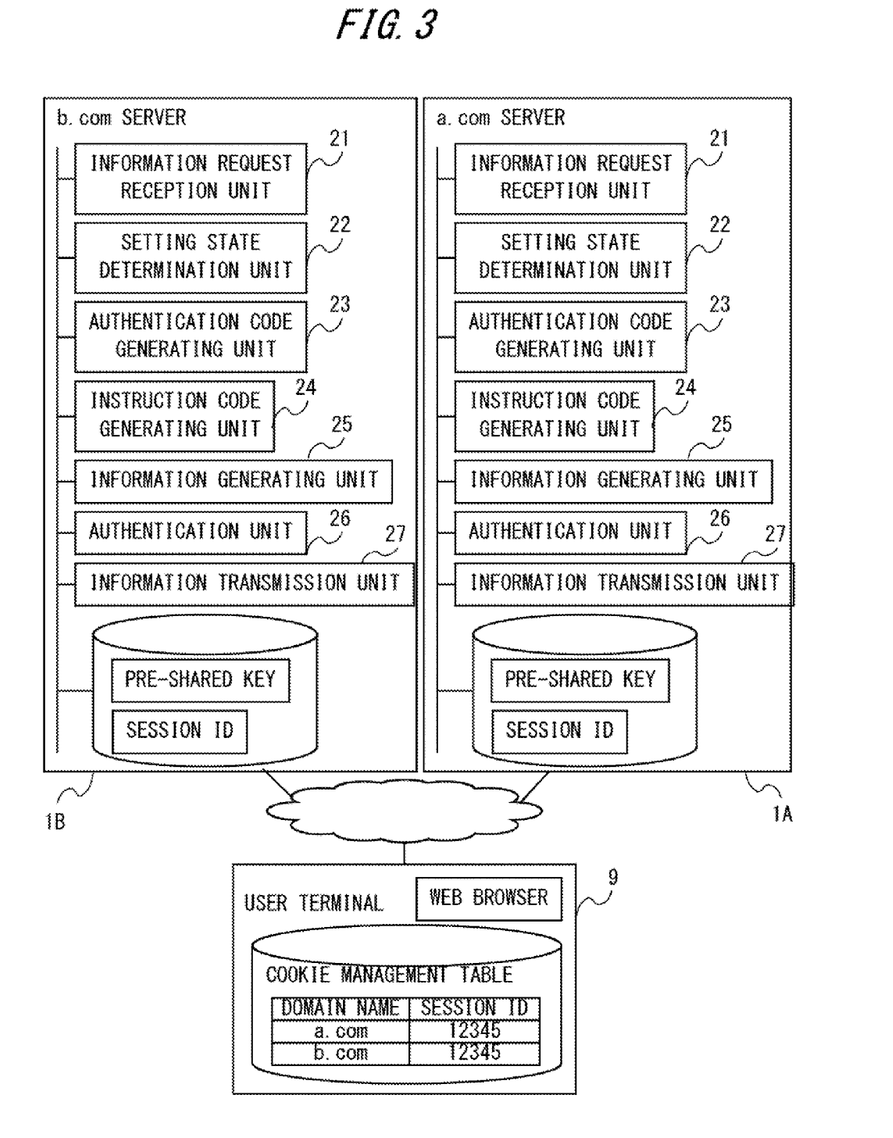
FIG. 3 is a diagram illustrating an outline of the functional configuration of the terminals that make up a system according to an embodiment.

FIG. 3 is a diagram illustrating an outline of the functional configuration of the terminals that make up the system according to the present embodiment. The a.com server 1A and the b.com server 1B according to the present embodiment each function as information processing apparatus that is provided with an information request reception unit 21, a setting state determination unit 22, an authentication code generating unit 23, an instruction code generating unit 24, an information generating unit 25, an authentication unit 26 and an information transmission unit 27, as a result of control of various hardware items provided in the server through interpretation/execution, by the CPU 11, of various programs that are deployed to the RAM 12. In the present embodiment, an example is explained wherein these functions are all executed by the general-purpose CPU 11, but some or all of the functions may be implemented by one or a plurality of dedicated processors.

The a.com server 1A and the b.com server 1B hold a pre-shared key set beforehand between the servers. This pre-shared key is used in a below-described authentication process. The servers issue a session ID, using cookies, to manage as a result communication between the user terminal 9 and the servers, and to identify the user terminal 9 or the user.

The user terminal 9, which is provided with a web browser, has a function of transmitting a request to a web server designated by a uniform resource locator (URL), a function of receiving, for instance, a web pace, a script or the like returned by the server in response to this request, and a function of interpreting/executing the received web page, script or the like. The user terminal 9 has a cookie management table, and holds cookies received from the web server, in the cookie management table, mapped to a domain name. Upon connection to a web server, the user terminal reads, from the cookie management table, the cookie corresponding to the domain name of the web server, and notifies the server of the read cookie.

<Process Flow>

The details of a process according to the present embodiment will be explained next with reference to FIG. 4 through FIG. 6. The concrete particulars, sequence and so forth of the process explained in the present embodiment are examples of implementation. The concrete processes particulars, sequence and so forth may be selected, as appropriate, in accordance with the exemplary embodiments.

Figure 4:
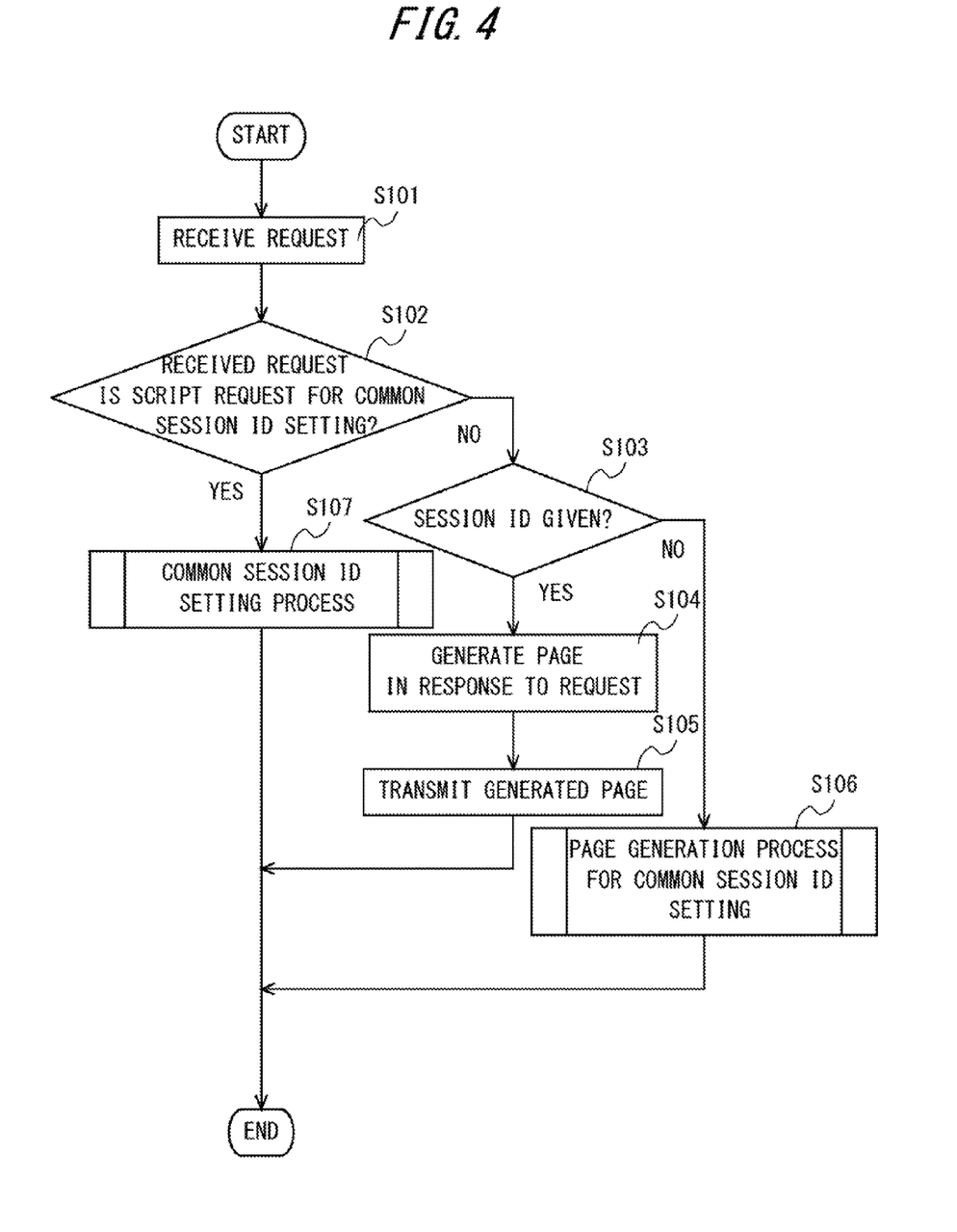
FIG. 4 is a flowchart illustrating the flow of a session ID sharing process, according to an embodiment.

FIG. 4 is a flowchart illustrating the flow of a session ID sharing process according to the present embodiment. The process illustrated in the present flowchart is initiated upon reception, by the a.com server 1A or the b.com server 1B, of a request transmitted by the user terminal 9.

In step S101 and step S102, the request transmitted by user terminal 9 is received, and the type of request is determined. The information request reception unit 21 receives the request transmitted by the user terminal 9 (step S101). Herein, the request may be a web page request (information request), or may be a script request, for instance a script for common session ID setting or the like. The server determines whether the received request is a web page request or a script request (step S102). If the request is determined to be a script request, the process proceeds to a common session ID setting process denoted by step S107. On the other hand, if the request is determined to be a web page request, the process proceeds to step S103.

In step S103 it is determined whether a session ID has been given or not. The setting state determination unit 22 determines whether or not a session ID has been set for the received request, to determine thereby whether or not a session ID has been set between the server and the user terminal 9. If it is determined that a session ID has been set, the process proceeds to step S104. On the other hand, if it is determined that no session ID has been set, the process proceeds to step S106.

A web page is generated and transmitted in step S104 and step S105. The a.com server 1A generates a web page in response to the request (step S104). The web page generated herein is generated in a state where a session ID has been given, and, accordingly, may be a web page that does not include a setting tag of a common session ID. The a.com server 1A transmits (step S105) the generated web page to the user terminal 9, which is the transmission source of the request received in step S101. The user terminal 9 receives the web page corresponding to the web page request, and the web page is outputted in the user terminal 9. The process illustrated in the present flowchart is then over.

In step S106 there is executed a page generation process for common session ID setting. Herein, the page generation process for common session ID setting is a process of generating a web page that includes an instruction code for setting a session ID that is shared by a plurality of websites (a.com and b.com in the present embodiment), as the web page that is transmitted to the user terminal 9, being the transmission source of the request received in step S101. The page generation process for common session ID setting will be explained in detail further on with reference to FIG. 5. The process denoted by the present flowchart ends when the page generation process for common session ID setting is over.

A common session ID setting process is executed in step S107. The common session ID generation process is a process of setting a session ID that is shared between a plurality of websites (a.com and b.com in the present embodiment), in the user terminal 9 that is the transmission source of the request received in step S101. The common session ID setting process will be explained in detail further on with reference to FIG. 6. The process in the present flowchart ends when the common session ID setting process is over.

Figure 5:
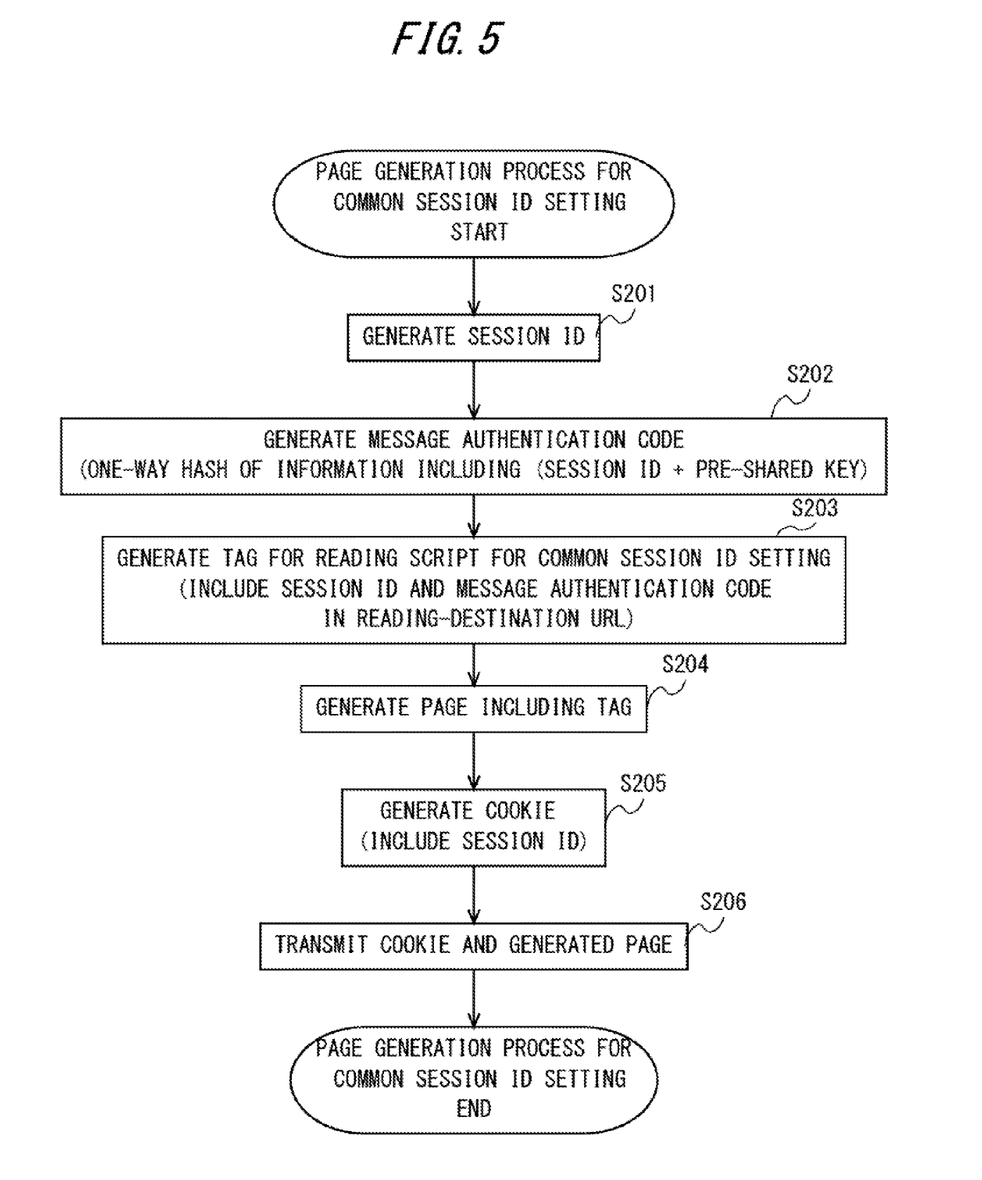
FIG. 5 is a flowchart illustrating the flow of a page generation process for common session ID setting, according to an embodiment.

FIG. 5 is a flowchart illustrating the flow of the page generation process for common session ID setting according to the present embodiment. The process illustrated in the present flowchart is initiated as the page generation process for common session ID setting of step S106 in the session ID sharing process explained with reference to FIG. 4. The present flowchart explains an instance where the request is received by the a.com server 1A. However, the flow of the process in a case where the request is received by the b.com server 1B is substantially identical, except that the a.com server 1A and the b.com server 1B are swapped.

A session ID is generated in step S201. The server (in the present embodiment, the a.com server 1A) generates a session ID, for identifying the user terminal 9 and communication with the user terminal 9, and issues the session ID to the user terminal 9, to which no session ID had been given. The process proceeds thereafter to step S202.

A message authentication code (MAC) is generated in step S202. The authentication code generating unit 23 generates the MAC that is used for authentication by the other server (the b.com server 1B in the present embodiment) that executes the common session ID setting process that is described below with reference to FIG. 6. The MAC generated herein allows authenticating that the instruction code generated in step S203 described below has been issued by the a.com server 1A. More specifically, the authentication code generating unit 23 calculates the MAC by performing one-way hash computation on data that includes the pre-shared key, shared beforehand between the a.com server 1A and the b.com server 1B, and the common session ID.

In step S203 there is generated a tag for causing the user terminal 9 to acquire a script for common session ID setting. The instruction code generating unit 24 generates an instruction code (tag) for connecting the user terminal 9 to the b.com server 1B, for which the common session ID is to be used, and for enabling the user terminal 9 to receive the common session ID from the b.com server 1B. Herein, the common session ID denotes a session ID the use whereof is shared by the a.com server 1A and the b.com server 1B, in communication with the user terminal 9.

The instruction code generated by the instruction code generating unit 24 includes a command, for the user terminal 9 that receives the web page, of requesting the script for common session ID setting through connection to the other server (herein, the b.com server 1B) that uses the common session ID. The domain name of the b.com server 1B, the session ID generated in step S201 and the MAC generated in step S202 are included in the URL that is used for connection from the user terminal 9 to the b.com server 1B.

In the present embodiment, the instruction code generating unit 24 does not interpret the instruction (tag or the like) described from the instruction code onwards, until the user terminal 9 ends the process denoted by the generated instruction code (tag); in other words, the instruction code generating unit 24 generates an instruction code such that the process is interrupted until the user terminal 9 ends the process denoted by the instruction code. For instance, the instruction code is described as a tag that instructs reading and execution of a script such as JavaScript (registered trademark) or the like from another information processing apparatus (herein, the b.com server 1B). The instruction code does not designate an option such that a subsequent instruction (tag or the like) is interpreted in advance before the instruction pertaining to the instruction code (script reading and execution) ends. In this case, the tag that is described from the instruction code onwards is not interpreted (the process is interrupted) until the end of the process of the command described by JavaScript (registered trademark) in the browser of the user terminal 9 that has received the web page.

Accordingly, it becomes possible to prevent a link to another site, for instance b.com or the like, from being displayed by the browser, through description of the instruction code generated by the instruction code generating unit 24 at a position, in the web page, interpreted and executed above the description of a link or the like to the other site, in other words at a position ahead of the link to the other site, in the source code of the web page. That is, it becomes possible to prevent the user from clicking the b.com link before sharing of the session ID and to prevent setting of a non-common session ID, by describing the instruction code at the top of the web page, and by using, as the script that is acquired according to the instruction code, a script described by JavaScript (registered trademark). The information acquired according to the instruction code is not limited to information described by JavaScript (registered trademark). Herein it suffices that the instruction code allows preventing access of the user terminal to the b.com server in accordance with another method, until setting of the common session ID according to the instruction code is over.

From step S204 to step S205, the web page and a cookie are generated and transmitted. The information generating unit 25 generates a web page that includes the tag (instruction code) generated in step S203, as the web page that is transmitted to the user terminal 9 in response to the web page request (step S204). Herein, as described above, the information generating unit 25 describes the tag (instruction code) that is generated by the instruction code generating unit 24 at a position that is interpreted/executed ahead of the link or the like to the other site, in the source code of the web page. The a.com server 1A generates, in step S201, a cookie for setting the generated session ID in the user terminal 9 (step S205). The information transmission unit 27 transmits, to the user terminal 9, the web page that includes the instruction code and the cookie that includes the session ID. The process illustrated in the present flowchart is then over.

The web page including the instruction code and the cookie including the session ID, as transmitted from the a.com server 1A, are received by the user terminal 9 in step S206. Upon reception of the web page and the cookie, the user terminal 9 sets the session ID included in the cookie as the session ID that is used in communication with the a.com server 1A. This session ID is a common session ID that is set also, as a result of the common session ID setting process described below, as the session ID that is used in communication with the b.com server 1B. The user terminal 9 executes the instruction code included in the web page, and requests the script to the b.com server 1B. Interpretation of a subsequent tag in the web page is interrupted until the instruction code is executed and there is set the common session ID from the b.com server 1B.

Figure 6:
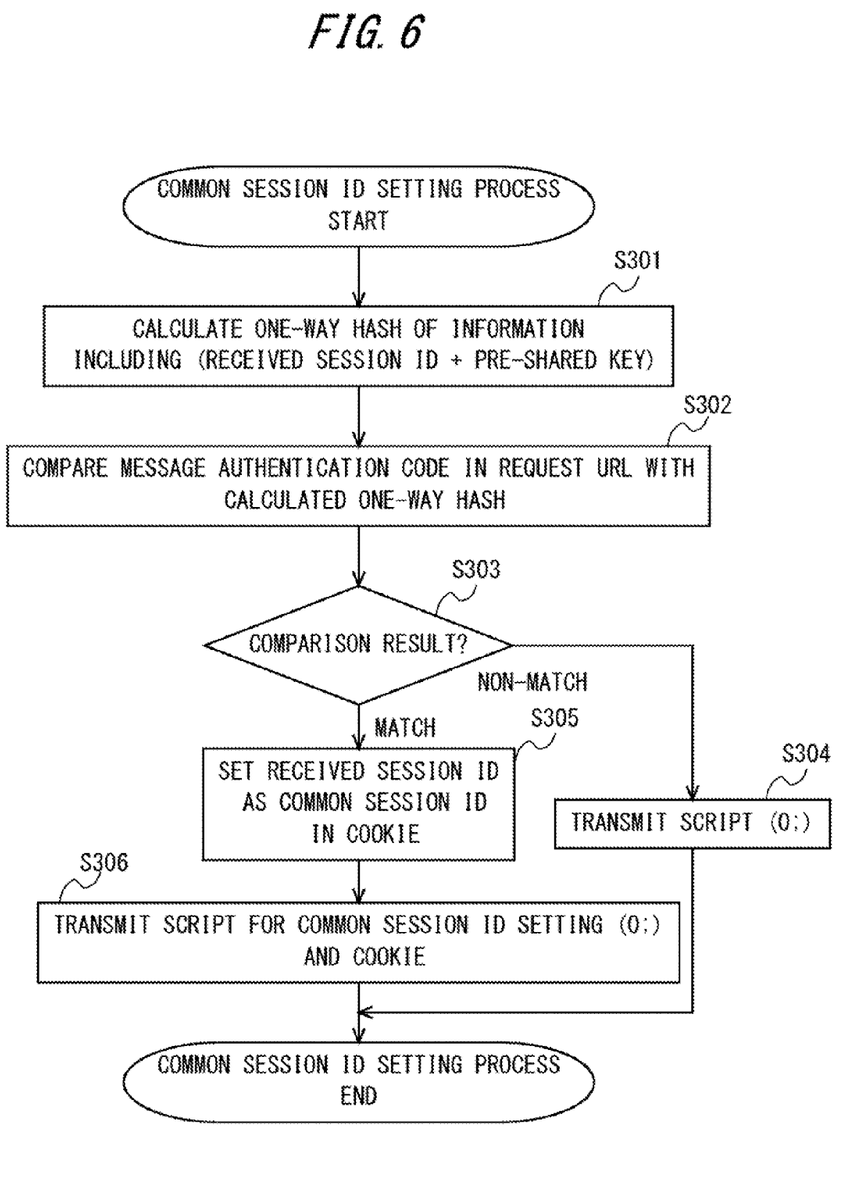
FIG. 6 is a flowchart illustrating the flow of a common session ID setting process, according to an embodiment.

FIG. 6 is a flowchart illustrating the flow of the common session ID setting process according to the present embodiment. The process illustrated in the present flowchart is initiated as the common session ID setting process of step S107 in the session ID sharing process explained with reference to FIG. 4. The present flowchart explains an instance where the request is received by the b.com server 1B. However, the flow of the process is substantially identical to that where the request is received by the a.com server 1A, except that the a.com server 1A and the b.com server 1B are swapped.

In step S301 and step S302 there is calculated a one-way hash for authenticating the request from the user terminal 9. As explained regarding step S203, the URL that is used for connection to the b.com server 1B in the present embodiment includes a session ID and an MAC that are set by the a.com server 1A. Accordingly, the authentication unit 26 authenticates whether or not the received script request is a request transmitted in accordance with the instruction code that is notified by the a.com server 1A, using the MAC included in the request received in step S101. More specifically, the authentication unit 26 performs one-way hash computation (step S301) on data that includes a pre-shared key, shared beforehand between the a.com server 1A and the b.com server 1B, and the session ID received in step S101. The authentication unit 26 compares the result of the one-way hash computation in step S301 with the MAC included in the request, to authenticate thereby whether or not the request of script for common session ID setting is a request transmitted in accordance with the instruction code notified by the a.com server 1A (step S302). The process proceeds thereafter to step S303.

The authentication result is determined in step S303 and step S304, so that, in case of authentication failure, the script is transmitted without a cookie for setting the common session ID. If as a result of the comparison of step S302 it is determined that the result of the one-way hash computation and the MAC do not match each other (mismatch), the process proceeds to step S304, and the b.com server 1B transmits the script to the user terminal 9 without the cookie for setting of the common session ID (step S304). The process illustrated in the present flowchart is then over. The script that is transmitted is not particularly limited. For instance, the script can be a script code (for example, "0;") that does not include a concrete command such as a display command for the user terminal 9. On the other hand, if as a result of the comparison of step S302, it is determined that the result of the one-way hash computation and the MAC match each other, the process proceeds to step S305.

In step S305 and step S306, a cookie is generated and is transmitted together with the script for common session ID setting. If the script request is authenticated by the authentication unit 26 to be a request transmitted in accordance with the instruction code issued by the a.com server 1A, then the b.com server 1B generates a cookie for setting the session ID received in step S101 (i.e. the session ID used between the a.com server 1A and the user terminal 9), as the common session ID, in the user terminal 9 (step S305). The information transmission unit 27 transmits the script for common session ID setting and the cookie that includes the common session ID, to the user terminal 9 (step S305). Herein, the script for common session ID setting that is transmitted is not particularly limited. For instance, the script can be a script code (for example, "0;") that does not include a concrete command such as a display command for the user terminal 9. The process illustrated in the present flowchart is then over.

The script for common session ID setting and the cookie that includes the common session ID, as transmitted by the b.com server 1B in step S306, is received by the user terminal 9. Upon reception of the script for common session ID setting and the cookie, the user terminal 9 sets the common session ID included in the cookie as the session ID that is used for communication with the b.com server 1B. The user terminal 9 resumes interpretation of the web page that was interrupted for the sake of common session ID setting, and outputs (for instance, displays on a display) the web page. The session ID used between the a.com server 1A and the user terminal 9 and the session ID used between the b.com server 1B and the user terminal 9 are thereafter the same session ID.

In the embodiment described above, only a session ID has been explained as the information included the cookie, but the cookie may also include information other than the session ID, for instance an identifier that is used by a load balancer for server load balancing or the like.

<Effect>

The system according to the present embodiment enables a common session ID to be used for a plurality of dissimilar websites. Accordingly, the user can be provided with a cross-service across sites, for a plurality of websites having dissimilar domain names, also in a case where the web browser that is provided in the user terminal 9 manages cookies for each domain name. For instance, the system according to the present embodiment enables sharing of a shopping cart among a plurality of websites that utilize dissimilar domains.

A conceivable method of sharing a session ID among a plurality of servers may involve including the session ID in the URL of the time at which the user terminal 9 accesses the server, to indentify thereby the user terminal 9 and/or the user. If such a scheme is resorted to, however, the session ID is apparent to the user, and, accordingly, there is a higher likelihood that the session ID becomes known to another user. The system according to the present embodiment enables sharing of a session ID more securely than in such a method.

In the system according to the present embodiment the server from which issuance of the common session ID is requested by the user terminal 9 (b.com server 1B in the above embodiment) authenticates whether or not the server that has issued the instruction code (a.com server 1A in the above embodiment) shares a pre-shared key beforehand, such that the common session ID can be set only for the user terminal 9 having a genuine instruction code. The system according to the present embodiment is more secure than a conventional system regarding this feature as well.

What is claimed is:

1. An information processing system comprising a first information processing apparatus and a second information processing apparatus that use a communication identifier in communication with a user terminal, wherein the first information processing apparatus includes a first processor configured to:

receive a first information request transmitted from the user terminal;

generate a communication identifier which is to be used in communication with the user terminal;

generate an instruction code that causes the user terminal to generate a second information request including the communication identifier which is received from the first information processing apparatus and transmit the second information request to the second information processing apparatus to notify the second information processing apparatus of the communication identifier, and causing the user terminal to receive the communication identifier from the second information processing apparatus, thereby sharing the communication identifier between the first information processing apparatus and the second information processing apparatus;

generate information including the instruction code, as information that is transmitted to the user terminal in response to the first information request; and transmit, to the user terminal, the communication identifier and the information including the instruction code as generated by the first processor, and wherein the second information processing apparatus includes a second processor configured to:

receive the second information request transmitted from the user terminal;

authenticate whether or not the second information request received by the second processor is transmitted in accordance with the instruction code notified by the first information processing apparatus; and transmit the communication identifier notified together with the second information request to the user terminal if the second information request is authenticated, by the second processor, to be transmitted in accordance with the instruction code.

2. The information processing system according to claim 1, wherein the instruction code is a code that allows interrupting interpretation of the information by the user terminal until a process of a command denoted by the instruction code is over.

3. The information processing system according to claim 1, wherein the first processor is further configured to generate an authentication code that allows authenticating that the instruction code has been issued by the first information processing apparatus, and wherein the instruction code causes the user terminal, which connects to the second information processing apparatus upon reception of the instruction code, to notify the second information processing apparatus of the authentication code included in the instruction code.

4. The information processing system according to claim 3, wherein the first processor is further configured to calculate the authentication code using data that includes a shared key that is shared beforehand between the first information processing apparatus and the second information processing apparatus, and the communication identifier.

5. The information processing system according to claim 4, wherein the first processor is configured to calculate the authentication code by performing one-way hash computation on data that includes a shared key that is shared beforehand between the first information processing apparatus and the second information processing apparatus, and the communication identifier.

6. The information processing system according to claim 1, wherein the first processor is further configured to determine whether or not a communication identifier between the first information processing apparatus and the user terminal has been set, and wherein the first processor is configured to generate the instruction code if the first processor determines that the communication identifier has not yet been set.

7. The information processing system according to claim 1, wherein the second processor is further configured to:

receive, together with the second information request, an authentication code that allows authenticating that the instruction code has been issued by the first information processing apparatus; and authenticate, using the authentication code, whether or not the second information request is an information request transmitted in accordance with the instruction code notified by the first information processing apparatus.

8. The information processing system according to claim 7, wherein the second processor is configured to authenticate whether or not the second information request is transmitted in accordance with the instruction code notified by the first information processing apparatus, by comparing the authentication code with a calculation result obtained by using data that includes a shared key that is shared beforehand between the first information processing apparatus and the second information processing apparatus, and the communication identifier received by the second processor.

9. The information processing system according to claim 1, wherein the second processor is configured to transmit, to the user terminal, the communication identifier, together with a code that does not include a concrete command for the user terminal.

* * * * *